United States Patent
Valentine et al.

(10) Patent No.: US 6,363,253 B1
(45) Date of Patent: Mar. 26, 2002

(54) SYSTEM AND METHOD FOR FLASH CALL SETUP IN AN INTERNET PROTOCOL BASED CELLULAR NETWORK

(75) Inventors: Eric Valentine, Plano; Andreea Timberlake, Grapevine, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/369,945

(22) Filed: Aug. 6, 1999

(51) Int. Cl.[7] .................................................. H04Q 7/20
(52) U.S. Cl. ...................... 455/445; 455/414; 455/422; 455/428; 455/460; 455/424
(58) Field of Search ................................. 455/450, 414, 455/445, 415, 424, 428, 460, 461, 560, 422; 370/351, 352, 353, 354, 355, 356, 328, 338, 400, 401; 709/223, 225, 229

(56) References Cited

U.S. PATENT DOCUMENTS

| | | | |
|---|---|---|---|
| 5,509,056 A | * 4/1996 | Ericsson et al. | 379/144 |
| 5,544,224 A | 8/1996 | Jonsson et al. | 379/58 |
| 5,774,530 A | * 6/1998 | Montgomery et al. | 379/112 |
| 5,793,762 A | * 8/1998 | Penners et al. | 370/389 |
| 5,805,078 A | * 9/1998 | Sugiyama et al. | 340/825.52 |
| 5,903,851 A | 5/1999 | Bäckström et al. | 455/557 |
| 6,112,099 A | * 8/2000 | Ketola | 455/466 |
| 6,160,804 A | * 12/2000 | Ahmed et al. | 370/349 |
| 6,185,288 B1 | * 2/2001 | Wong | 379/219 |
| 6,205,126 B1 | * 3/2001 | Moon | 370/329 |
| 6,256,300 B1 | * 7/2001 | Ahmed et al. | 370/331 |
| 6,289,212 B1 | * 7/2001 | Stein et al. | 455/412 |
| 6,272,126 B1 | * 8/2001 | Strauss et al. | 370/352 |

FOREIGN PATENT DOCUMENTS

| | | |
|---|---|---|
| EP | 0 642 283 A2 | 3/1994 |
| EP | 0 872 982 A1 | 10/1998 |

OTHER PUBLICATIONS

PCT International Search Report dated Nov. 9, 2000.

* cited by examiner

*Primary Examiner*—Daniel Hunter
*Assistant Examiner*—Yemane Woldetatios
(74) *Attorney, Agent, or Firm*—Jenkens & Gilchrist, P.C.

(57) ABSTRACT

A telecommunications system and method is disclosed for decreasing the average call setup time in a cellular network by using an Internet Protocol based cellular network. Call information (such as routing information, channel types, etc.) for a particular call initiated by a calling Mobile Station (MS) can be stored in a call cache within a serving Mobile Switching Center (MSC) to immediately allow the same call to be re-established without tying-up circuits. A call cache identifier (CCI) is assigned to that call cache and passed to the calling MS. When the MSC receives a call from the calling MS, the MSC determines whether a CCI is included with the call. If not, call setup proceeds as normal, and the MSC creates a call cache for the call, assigns a CCI to the call cache and returns the CCI to the calling MS. If a CCI is received with the call, the MSC accesses the call cache associated with the received CCI, and uses the call setup information stored in the call cache to re-establish the call.

25 Claims, 5 Drawing Sheets

SYSTEM AND METHOD FOR FLASH CALL SETUP IN AN INTERNET PROTOCOL BASED CELLULAR NETWORK

BACKGROUND OF THE PRESENT INVENTION

1. Field of the Invention

The present invention relates generally to telecommunications systems and methods for establishing a call connection within a cellular network, and specifically to reducing the call setup time for calls within an internet protocol based cellular network.

2. Background of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a sample GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit-switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

As the amount of traffic within cellular networks 10 increases, so does the amount of time required to setup a call to or from an MS 20. Long call setup times are frustrating to calling subscribers. The longer the call setup time, the less likely the calling subscriber will be to use the system, and the lower the perceived quality of the system. Currently, little is being done to shorten the call setup time. In some cases, an attempt is made to mollify the calling subscriber by playing tones or announcements while they are waiting for the connection to go through. These tones or announcements really only tell the calling subscriber that something is happening, but it does not speed up the connection time.

SUMMARY OF THE INVENTION

The present invention is directed to telecommunications systems and methods for decreasing the average call setup time in a cellular network. Existing call setup procedures are based on establishing a circuit connection. At the end of the call, the circuit connection is released. In order to setup another call, another circuit connection must be established. However, in Internet Protocol (IP)-based cellular networks, circuits are not used. Instead, the bandwidth is shared as an aggregate. Therefore, by using an IP-based cellular network, call information (such as routing information, channel types, etc.) for a particular call initiated by a calling MS can be stored in a call cache within a serving Mobile Switching Center (MSC) to immediately allow a call to the same called party number with the same bearer capabilities set to be re-established without tying-up circuits. A call cache identifier (CCI) can be assigned to that call cache. This CCI is preferably stored in both the MSC and in the calling MS. When the calling MS wants to re-establish a previous call, the calling MS can include the CCI for that previous call with the call setup message. Thereafter, the MSC accesses the call cache associated with the received CCI, and uses the call setup information stored in the call cache to re-establish the call.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Call setup procedures in existing cellular networks are based on circuit-switched call establishment. At call completion, the circuits used for the call must be released in order to be re-used for other calls. In order to re-establish the same call, another circuit must be established. However, in an Internet Protocol (IP)-based cellular network, circuits are not used. Rather, the bandwidth is shared as an aggregate.

Figure 1:
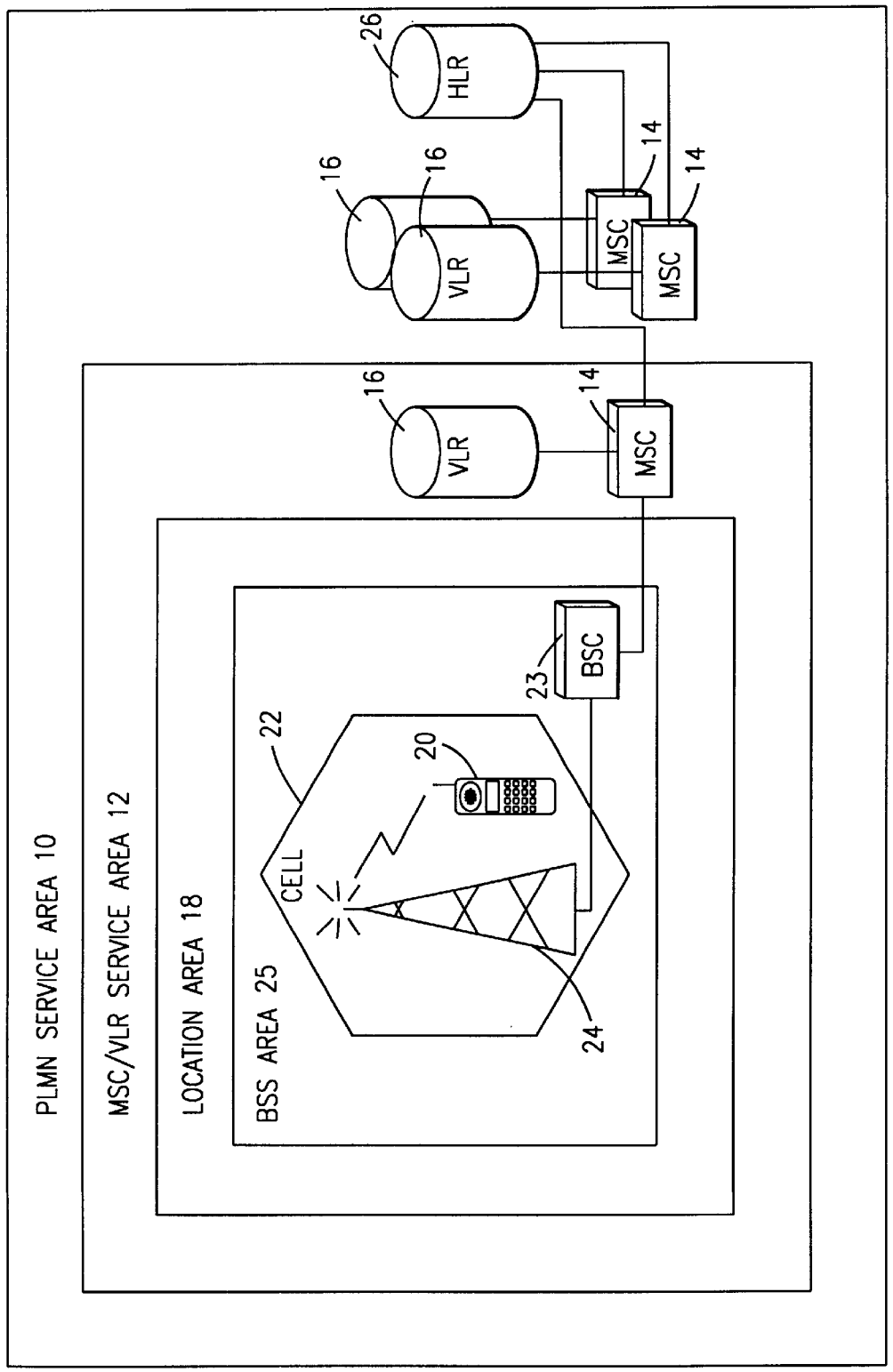
FIG. 1 is a block diagram of a conventional Global System for Mobile Communications (GSM) digital cellular network.
Figure 2:
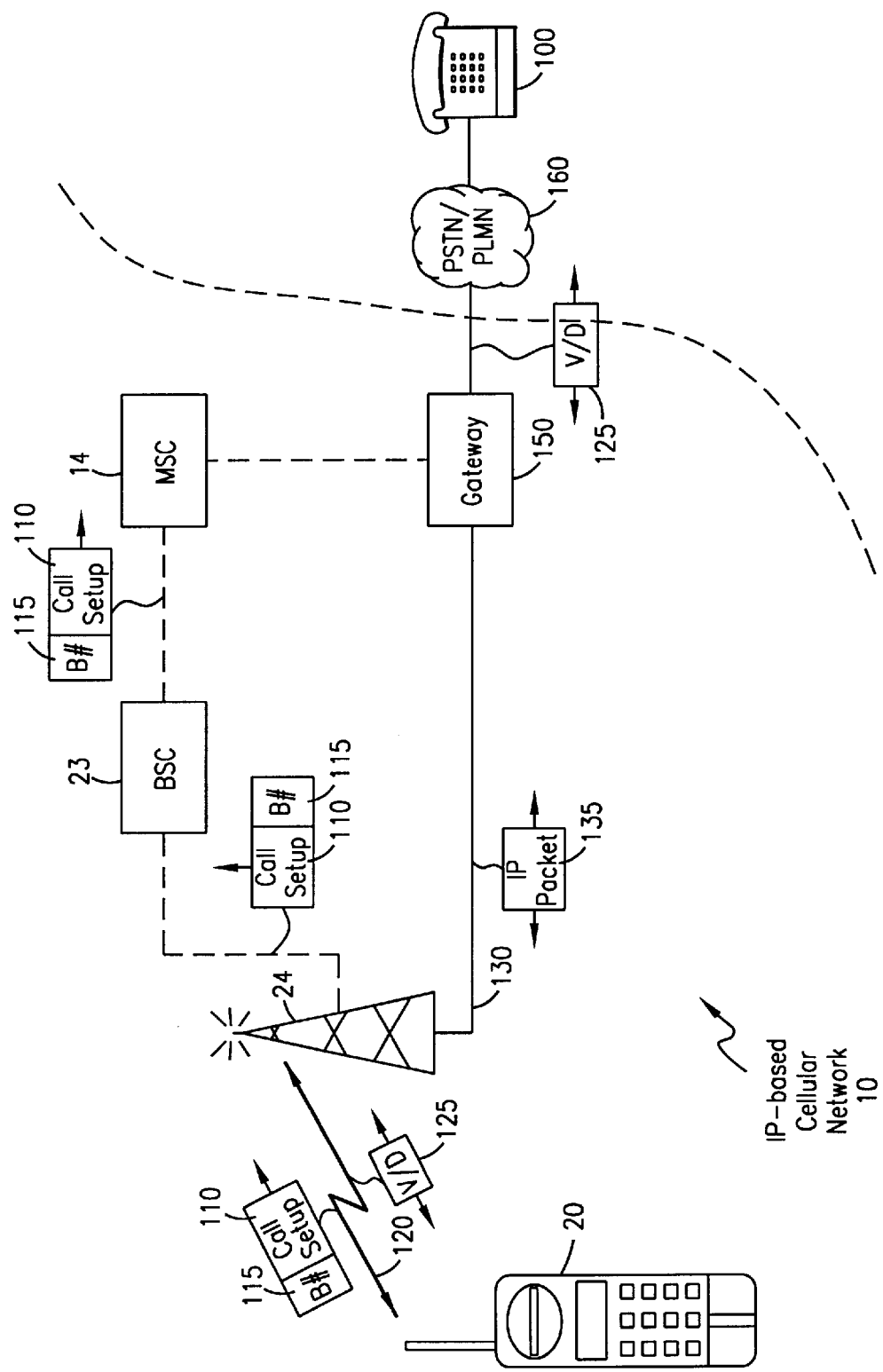
FIG. 2 illustrates an Internet Protocol (IP)-based cellular network.

With reference now to FIG. 2 of the drawings, in such an IP-based cellular network 10, when a Mobile Station (MS) 20 wants to establish a call connection to a called party 100, the signaling involved in establishing the call connection takes place on a different network, which is shown by the dotted lines, than the transmission of voice and/or data to or from the MS 20, which is shown by the solid line. For example, to establish the call connection, the MS 20 first uses a Random Access Channel over an air interface 120 between the MS 20 and a Base Transceiver Station (BTS) 24 serving the MS 20 to request a signaling channel from a Base Station Controller (BSC) 23 associated with the BTS 24. Once the BSC 23 allocates the signaling channel, the MS 20 sends a call setup request 110, using the allocated signaling channel, to a Mobile Switching Center (MSC) 14 serving the BSC 23. Thereafter, the MSC 14 performs call setup procedures, such as authenticating the MS 20, selecting a ciphering mode, checking subscriber services associated with the MS 20 and retrieving a B-number 115 associated with the called party from the MS 20.

Once the MSC 14 has completed the call setup procedures, the MSC 14 requests the BSC 23 to allocate a traffic channel to the MS 20. In response, the BSC 23 forwards the assigned traffic channel to the BTS 24 and the MS 20, and instructs the BTS 24 and MS 20 to activate the traffic channel. Finally, the MSC 14 forwards the B-number 115 to a Gateway 150 serving the Public Land Mobile Network (PLMN) 10 associated with the MSC 14 to connect the call to the called party via the circuit-switched PSTN/PLMN 160 if the called party is a wireline subscriber or located within another PLMN.

Once the call connection has been established, voice and/or data 125 can be transmitted between the MS 20 and the called party. Since the cellular network 10 shown in FIG. 2 is IP-based, this voice and/or data 125 is passed between the MS 20 and the Gateway 150 directly through a connection 130 between the Gateway 150 and the BTS 24. For example, voice and/or data 125 sent from the MS 20 to the BTS 24 over the air interface 120 is converted by the BTS 24 from the circuit-switched format used by the MS 20 to IP packets 135 in a packet-switched format used by the IP-based PLMN 10. Once the voice and/or data 125 has been converted into the IP packets 135, the BTS 24 routes the IP packets 135 to the Gateway 150, using the destination IP address received from the MSC 14, sent either directly or via the BSC 23. Upon receipt of the IP packets 135, the Gateway 150 converts the IP packets 135 back into the voice and/or data 125 and transmits the voice and/or data 125 to the called party 100.

The process is reversed for voice and/or data 125 received by the MS 20. For example, once the Gateway 150 receives the circuit-switched voice and/or data 125 from the called party 100, the Gateway 150 converts the voice and/or data 125 into IP packets 135, and routes the IP packets 135 to the IP address associated with the MS 20 (e.g. BTS 24), using the destination IP address received from the MSC 14. Upon receipt of the IP packets 135, the BTS 24 determines that the IP packets 135 are for the MS 20, converts these IP packets 135 back into the circuit-switched voice and/or data 125 and transmits this voice and/or data to the MS 20 over the air interface 120.

Figure 3:
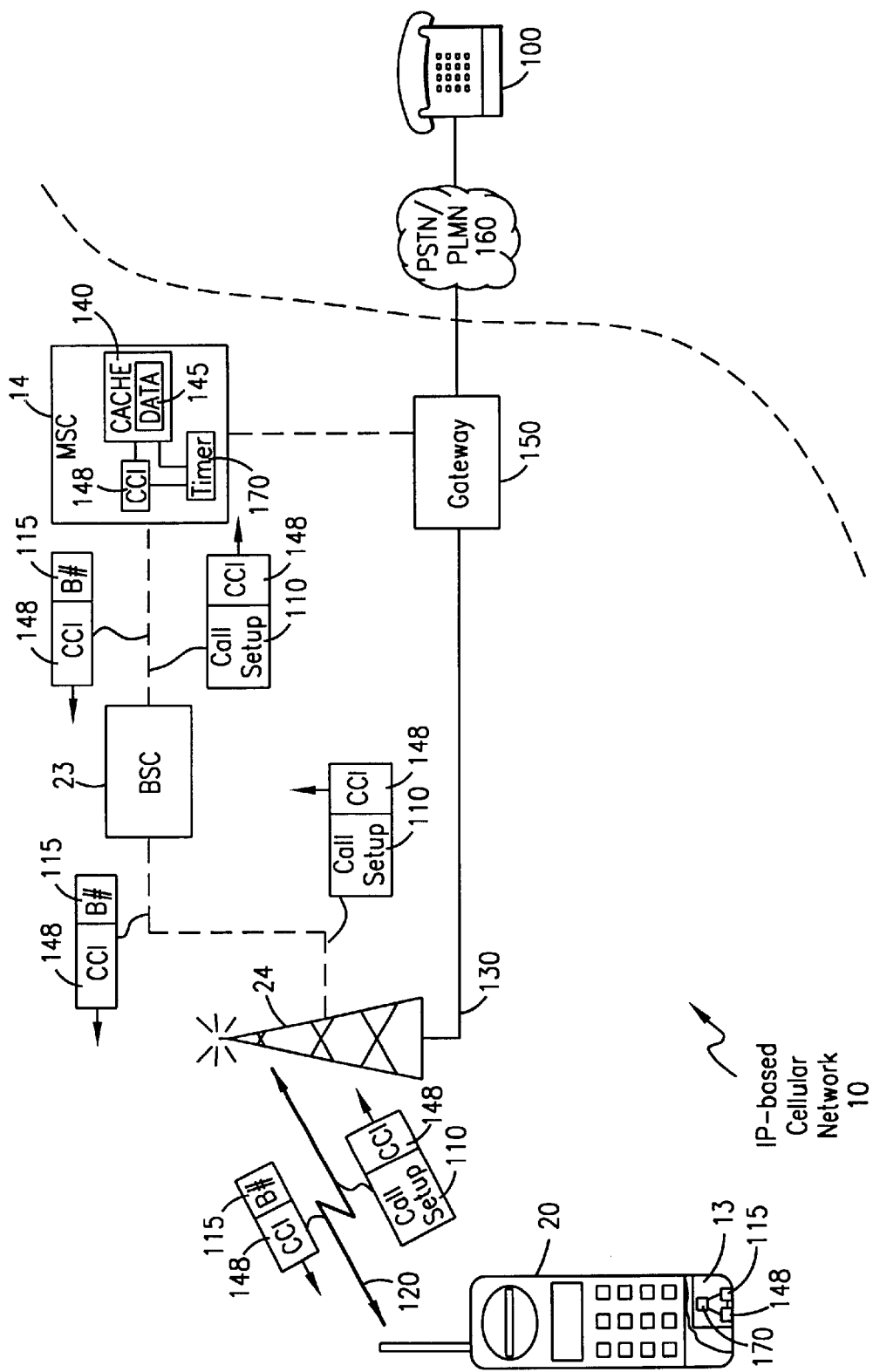
FIG. 3 illustrates the creation of a call cache and the assignment of a call cache identifier to the call cache within an IP-based cellular network in accordance with preferred embodiments of the present invention.

With reference now to FIG. 3 of the drawings, in order to reduce the average amount of time required for call setup in an IP-based cellular network 10, during or upon completion of a call between the MS 20 and a called party 100, call data 145, such as routing information, e.g., an IP address for a node to route the call to, ciphering modes, billing rates, authentication results, channel types, etc., can be stored within a call cache 140 within the MSC 14. The call cache 140 is a set of data 145 associated with a particular "call." For the purpose of this invention, a "call" is defined as a connection between two subscribers that may be re-established at a later time.

Figure 4:
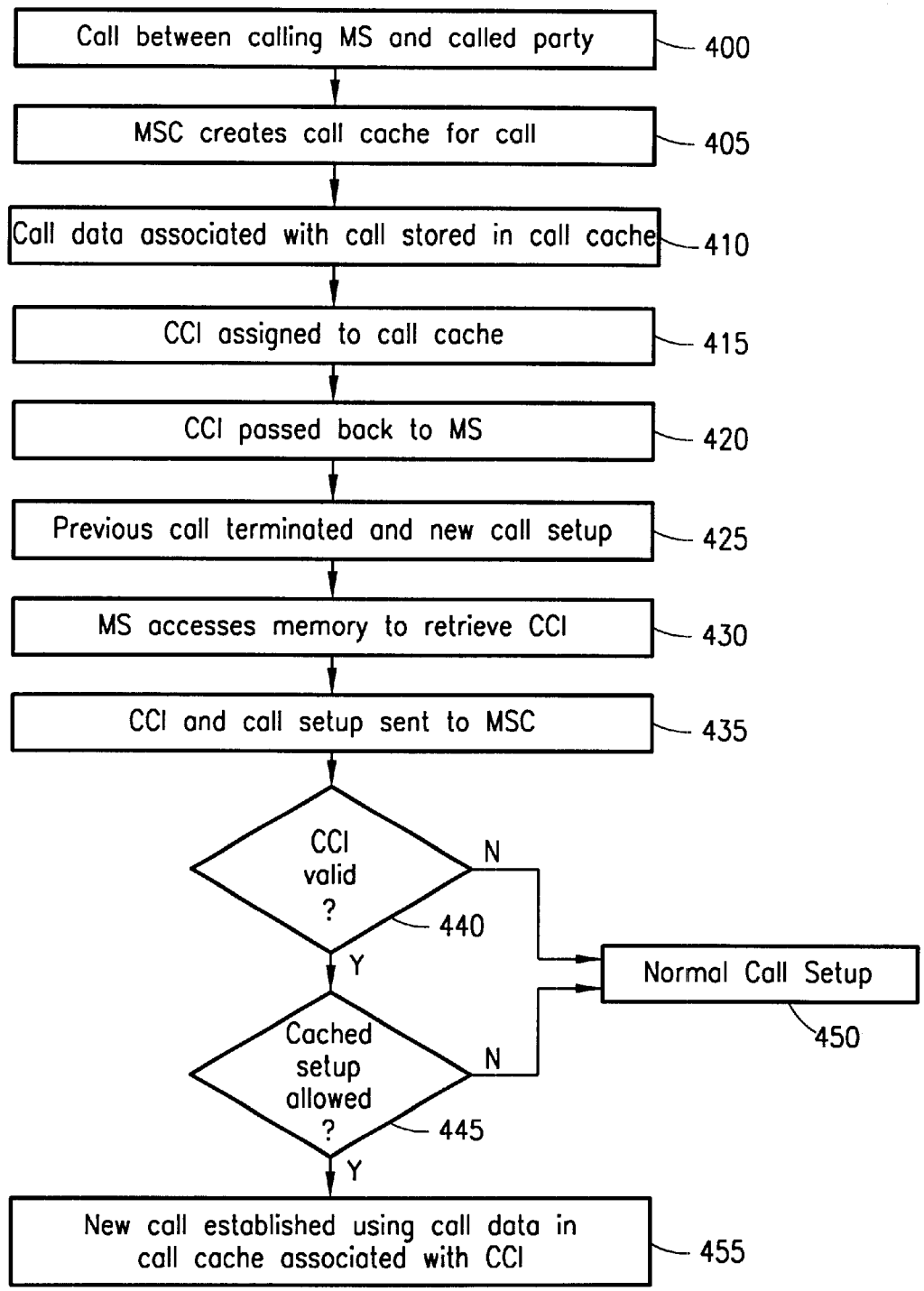
FIG. 4 illustrates the steps for creating, storing and using the call cache shown in FIG. 3 of the drawings.

With reference now to the steps listed in FIG. 4 of the drawings, during or upon completion of a particular call between the MS 20 and the called party 100 (step 400), the MSC 14 creates the call cache 140 for that particular call (step 405), and stores the call data 145 associated with that particular call within the call cache 140 within the MSC 14 (step 410). At this time, the MSC 14 also assigns a call cache identifier (CCI) 148 to the call cache 140 (step 415). The CCI 148 provides a means of identifying the particular call cache 140. This CCI 148, along with the called party number 115 associated with the call cache 140, is also passed back to the MS 20 for storage within a memory 13, such as a Subscriber Identity Module (SIM) card, therein (step 420).

Thereafter, when the MS 20 places another call to the same called party number 115 with the same bearer capabilities set (step 425), the MS 20 accesses the memory 13 to retrieve the CCI 148 associated with that called party number 115 (step 430), and transmits the retrieved CCI 148 to the MSC 14 along with the call setup message 110 (step 435). For example, within an IP-based GSM network, the CCI 148 can be sent in the CM Service Request message to the MSC 14. In this case, the MSC 14 would receive this CCI 148 in the Complete layer 3 message.

Once the MSC 14 receives the CCI 148 (step 435), the MSC 14 determines whether the CCI 148 is valid (step 440), and whether a cached call setup is allowed (step 445). For example, there may be a limit on the number of cached calls that can be allowed without authentication. If the CCI 148 is not valid (step 440), or if the cached call setup is not allowed (step 445), the call proceeds normally (step 450). However, if the cached call setup is allowed (step 445), the call setup is performed using the call data 145 stored in the call cache 140 (step 455). As stated before, this call data 145 consists of the results of the previous call setup. Therefore, this new call can be immediately re-reestablished based upon the results of the previous call without unnecessarily tying-up circuits.

In order to re-use CCIs 148 and limit the number of caches 140 stored in the MSC 14 at any one time, the MSC 14 can maintain an operator defined timer 170 to determine when to discard a particular call cache 140 and associated CCI 148. For example, when the MSC 14 first assigns a CCI 148 to a particular call cache 140 and passes this CCI 148 to the MS 20, the MSC 14 can initiate the timer 170. If the MSC 14 does not receive that particular CCI 148 from the MS 20 in, for example, a Complete layer 3 message, before the timer 170 expires, the call cache 140 associated with that particular CCI 148 is deleted from the MSC 14 and the CCI 148 goes back into the queue of available CCIs 148.

However, if the MSC 14 does receive that particular CCI 148 before the timer 170 expires, the timer 170 can be re-initialized upon receipt of that particular CCI 148.

It should be noted that a notification of the timer 170 period can be passed to the MS 20 along with the CCI 148, so that the MS 20 will not transmit CCIs 148 that are no longer valid to the MSC 14. Alternatively, when the timer 170 expires, the MSC 14 can send a message (not shown) to the MS 20 indicating that the CCI 148 is no longer valid. In addition, in preferred embodiments, the CCI 148 can be deleted from the MS 20 and the MSC 14 when the MS 20 performs a location update to a new MSC 14 or performs an explicit detach from the network 10. Therefore, the MS 20 will not send the CCI 148 if the serving BTS 24, BSC 23 and/or MSC 14 has changed. Similarly, advantageously, the MSC 14 will not store any CCIs 148 and associated call caches for MSs 20 that are no longer connected to the network 10.

Figure 5:
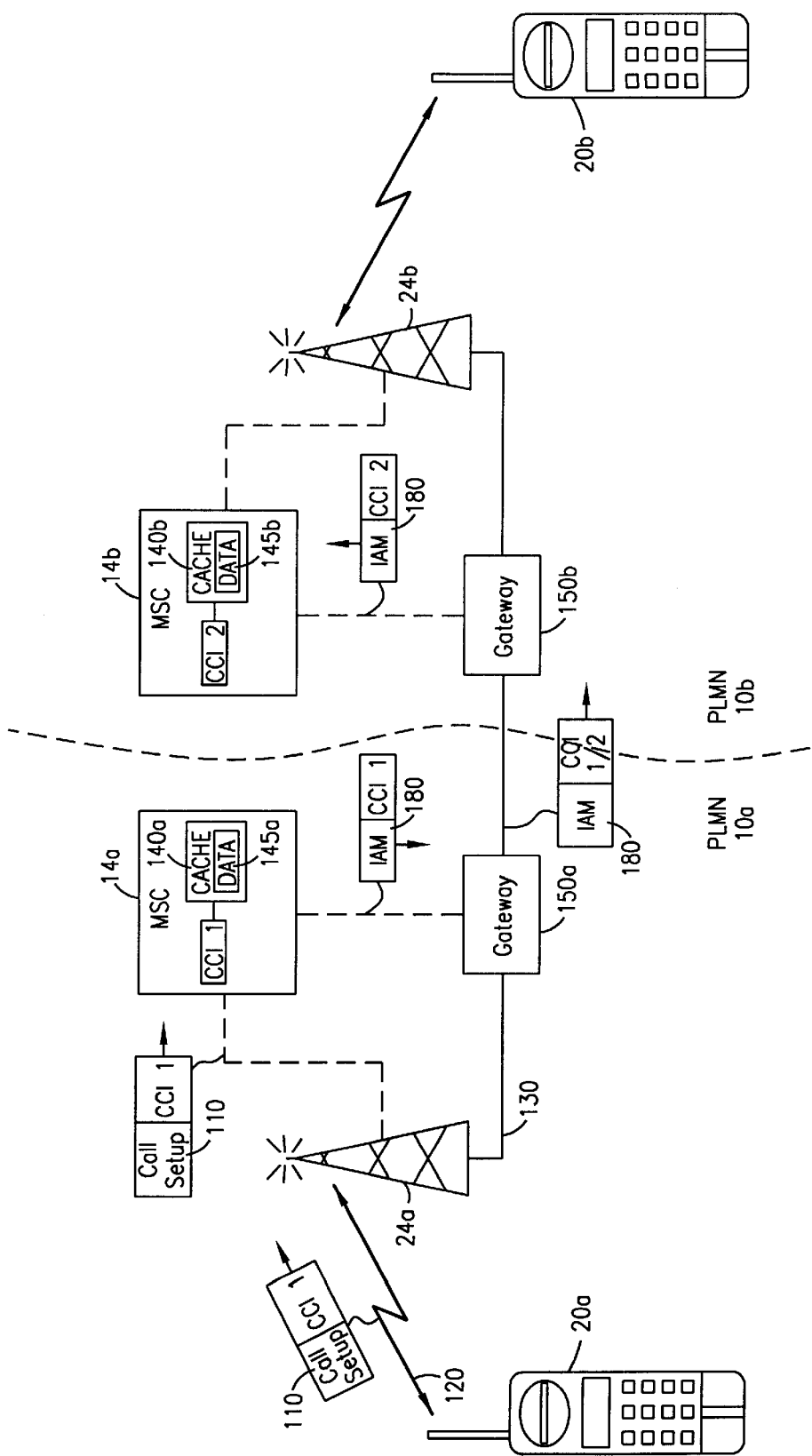
FIG. 5 illustrates the re-establishment of a call connection between two mobile stations within an IP-based cellular network in accordance with embodiments of the present invention.

With reference now to FIG. 5 of the drawings, a sample call re-establishment procedure between two MSs 20a and 20b within two separate PLMNs 10a and 10b is shown. During or after the initial call between the calling MS 20a and the called MS 20b is completed, the MSC 14a serving the calling MS 20a creates a call cache 140a containing called data 145a for the call and assigns a CCI, here CCI 1, to that call cache 140a. At this time, CCI 1 may also be passed to the Gateways 150a and 150b and possibly to the other MSC 14b within PLMN 10b.

In addition, if PLMN 10b is also an IP-based cellular network, MSC 14b may create an additional call cache 140b, storing all of the call data 145b relevant to the call involving MS 20b within PLMN 10b, and assign another CCI, here CCI 2, to that additional call cache 140b. This additional CCI 2 may also be passed to the Gateways 150a and 150b and possibly to the MSC 14a serving the original calling MS 20a.

When the original call is cleared, relevant IP addresses or sockets are marked as ready for use, for instance, between BTS 24a and Gateway 150a. In addition, in preferred embodiments, the Gateway 150a associated with PLMN 10a may retain a call cache (not shown) containing routing information for use in reaching Gateway 150b or MSC 14a, and associate this call cache with CCI 1 and/or CCI 2. Similarly, Gateway 150b in PLMN 10b may retain a call cache (not shown) for reaching MSC 14b or Gateway 150a, and associate this call cache with CCI 2 and/or CCI 1.

When another call is made by either MS 20a or MS 20b to the other, the call caches 140a and 140b can be used to re-establish the call with a reduced call setup time. For example, if MS 20a sends a new call setup message 110 to MSC 14a, MSC 14a checks to see whether CCI 1 is also received from the calling MS 20a. If not, call setup proceeds as normal. If so, and if cached call setup is allowed, MSC 14a uses the call data 145a within the call cache 140a associated with CCI 1 within MSC 14a to re-establish the call.

Thereafter, MSC 14a sends a message 180 (equivalent to an Initial Address Message (IAM) or SETUP message) to the Gateway 150a that is indicated in the call cache 140a (and which was the result of the original calling party number analysis). This message 180 may also contain the associated CCI 1. If the Gateway 150a maintains its own call cache associated with CCI 1, the Gateway 150a proceeds to route the call based upon the cached call data. Otherwise, the Gateway 150a may need to perform an analysis to determine the Gateway 150b within PLMN 10b. Thereafter, Gateway 150a forwards the message 180 (SETUP, IAM or equivalent) to Gateway 150b. This message 180 may also include CCI 1 and/or CCI 2.

Gateway 150b, in turn, may have retained a call cache (not shown) identified by CCI 1 and/or CCI 2. If CCI 1 and/or CCI 2 is received with the message sent by Gateway 150a, this allows Gateway 150b to identify MSC 14b, and forward the message 180 (SETUP, IAM or equivalent) to MSC 14b without performing any additional analysis. This message 180 also preferably contains CCI 2 to aid MSC 14b in quick re-establishment of the call to MS 20b via BTS 24b. Based upon CCI 2, MSC 14b can, in turn, bypass parts of the call re-establishment procedure using the call data 145b stored within the call cache 140b associated with CCI 2 within the MSC 14b.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for reducing the call setup time for re-establishing a new call based upon a previous call between two subscribers, at least one of which is located within an internet protocol based cellular network, comprising:

a mobile station within said internet protocol based cellular network having a memory therein for storing a call cache identifier associated with a called party number, said mobile station transmitting said call cache identifier along with a call setup message to re-establish said new call to said called party number;

a call cache containing call data associated with said previous call between said mobile station and said called party number, said call cache having said call cache identifier associated therewith; and a mobile switching center within said internet protocol based cellular network in wireless communication with said mobile station, said mobile switching center receiving said call setup message and said call cache identifier and accessing said associated call cache to re-establish said new call using said call data associated with said previous call.

2. The telecommunications system of claim 1, wherein said call cache is stored within said mobile switching center.

3. The telecommunications system of claim 1, wherein said call data includes an internet protocol address of a node to route said new call to.

4. The telecommunications system of claim 3, wherein said call data further includes billing information, ciphering mode information, authentication information and channel type information.

5. The telecommunications system of claim 3, wherein said node is a Gateway associated with said internet protocol based cellular network.

6. The telecommunications system of claim 5, wherein said Gateway stores additional call data within an additional call cache associated with said call cache identifier therein, said Gateway using said additional call data to route said call to said called party number.

7. The telecommunications system of claim 5, further comprising:

a base transceiver station for converting voice and data received from said mobile station into internet protocol packets and transmitting said internet protocol packets directly to said Gateway.

8. The telecommunications system of claim 7, wherein said Gateway further converts said internet protocol packets back into said voice and data and transmits said voice and data to said called party number.

9. The telecommunications system of claim 1, further comprising:
a timer associated with said call cache identifier, said timer being initiated when said call cache identifier is assigned to said call cache, said call cache identifier being discarded when said timer expires.

10. The telecommunications system of claim 9, wherein said timer is within said mobile switching center, said call cache being discarded when said timer expires.

11. The telecommunications system of claim 9, wherein said timer is within said mobile station.

12. The telecommunications system of claim 9, wherein said timer is re-initialized when said call cache identifier is received by said mobile switching center.

13. The telecommunications system of claim 1, wherein said call setup message is a CM Service Request message.

14. The telecommunications system of claim 1, further comprising:
an additional mobile station associated with said called party number, said additional mobile station being served by an additional mobile switching center.

15. The telecommunications system of claim 14, wherein said additional mobile switching center stores therein additional call data within an additional call cache.

16. The telecommunications system of claim 15, wherein said new call is routed to said additional mobile switching center, and said additional mobile switching center uses said additional call data to complete said new call to said additional mobile station.

17. A method for reducing the call setup time for re-establishing a new call based upon a previous call between two subscribers, at least one of which is located within an internet protocol based cellular network, comprising the steps of:
creating a call cache containing call data associated with a previous call between a mobile station within said internet protocol based cellular network and a called party number;
assigning a call cache identifier to said call cache;
storing within said mobile station said call cache identifier and said called party number;
transmitting said call cache identifier along with a call setup message from said mobile station to a mobile switching center in wireless communication with said mobile station;
accessing said call cache associated with received call cache identifier; and
re-establishing said new call from said mobile station to said called party number using said call data associated with said previous call.

18. The method of claim 17, wherein said call data comprises an internet protocol address of a Gateway associated with said internet protocol based cellular network, and wherein said step of re-establishing further comprises the steps of:
storing, within said Gateway, additional call data within an additional call cache associated with said call cache identifier; and
routing said new call from said Gateway to said called party number using said additional call data.

19. The method of claim 18, further comprising the steps of:
converting, by a base transceiver station in wireless communication with said mobile station, voice and data received from said mobile station into internet protocol packets; and
transmitting said internet protocol packets directly to said Gateway.

20. The method of claim 19, further comprising the steps of:
converting, by said Gateway, said internet protocol packets back into said voice and data; and
transmitting said voice and data to said called party number.

21. The method of claim 17, further comprising the steps of:
initiating a timer associated with said call cache identifier when said call cache identifier is assigned to said call cache; and
discarding said call cache identifier when said timer expires.

22. The method of claim 21, further comprising the step of:
discarding said call cache when said timer expires.

23. The method of claim 21, further comprising the step of:
re-initializing said timer when said call cache identifier is received by said mobile switching center.

24. The method of claim 17, wherein an additional mobile station is associated with said called party number, said additional mobile station being served by an additional mobile switching center, and wherein said step of re-establishing further comprises the step of:
storing within said additional mobile switching center additional call data within an additional call cache.

25. The method of claim 24, wherein said step of re-establishing further comprises the steps of:
routing said new call to said additional mobile switching center; and
completing said new call to said additional mobile station by said additional mobile switching center using said additional call data.

* * * * *